(12) United States Patent
Nishikawa et al.

(10) Patent No.: US 8,577,646 B2
(45) Date of Patent: Nov. 5, 2013

(54) USER EVALUATION APPARATUS DEPENDING ON HARDWARE USAGE STATUS

(75) Inventors: Takeichiro Nishikawa, Yokohama (JP); Minoru Yonezawa, Tokyo (JP); Chie Morita, Kunitachi (JP); Minoru Nakatsugawa, Yokohama (JP); Kenji Hirohata, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 891 days.

(21) Appl. No.: 12/748,827

(22) Filed: Mar. 29, 2010

(65) Prior Publication Data

US 2010/0250450 A1   Sep. 30, 2010

(30) Foreign Application Priority Data

Mar. 30, 2009   (JP) ................................. 2009-082989

(51) Int. Cl.
*G06F 11/30* (2006.01)

(52) U.S. Cl.
USPC .......................................................... 702/183

(58) Field of Classification Search
USPC ................. 702/34, 35, 80–82, 179, 181–184; 701/29, 29.9; 714/4.3
See application file for complete search history.

(56) References Cited

U.S. PATENT DOCUMENTS

| 6,199,018 B1 | 3/2001 | Quist et al. ....................... 702/34 |
| 6,892,317 B1 * | 5/2005 | Sampath et al. ................ 714/4.3 |
| 2007/0294001 A1 * | 12/2007 | Underdal et al. ............... 701/29 |

FOREIGN PATENT DOCUMENTS

JP   2006-127070   5/2006

* cited by examiner

*Primary Examiner* — Mohamed Charioui
(74) *Attorney, Agent, or Firm* — Ohlandt, Greeley, Ruggiero & Perle, L.L.P.

(57) ABSTRACT

A user evaluation apparatus includes a parameter determination module which determines parameters of a user evaluation model required to calculate a degree of usage influence so as to maximize a target function. The target function may be defined using weight values, measurement data, and a failure information counting result. The apparatus also includes a user evaluation module which calculates and displays the degree of usage influence using the measurement data and the parameters of the user evaluation model.

9 Claims, 18 Drawing Sheets

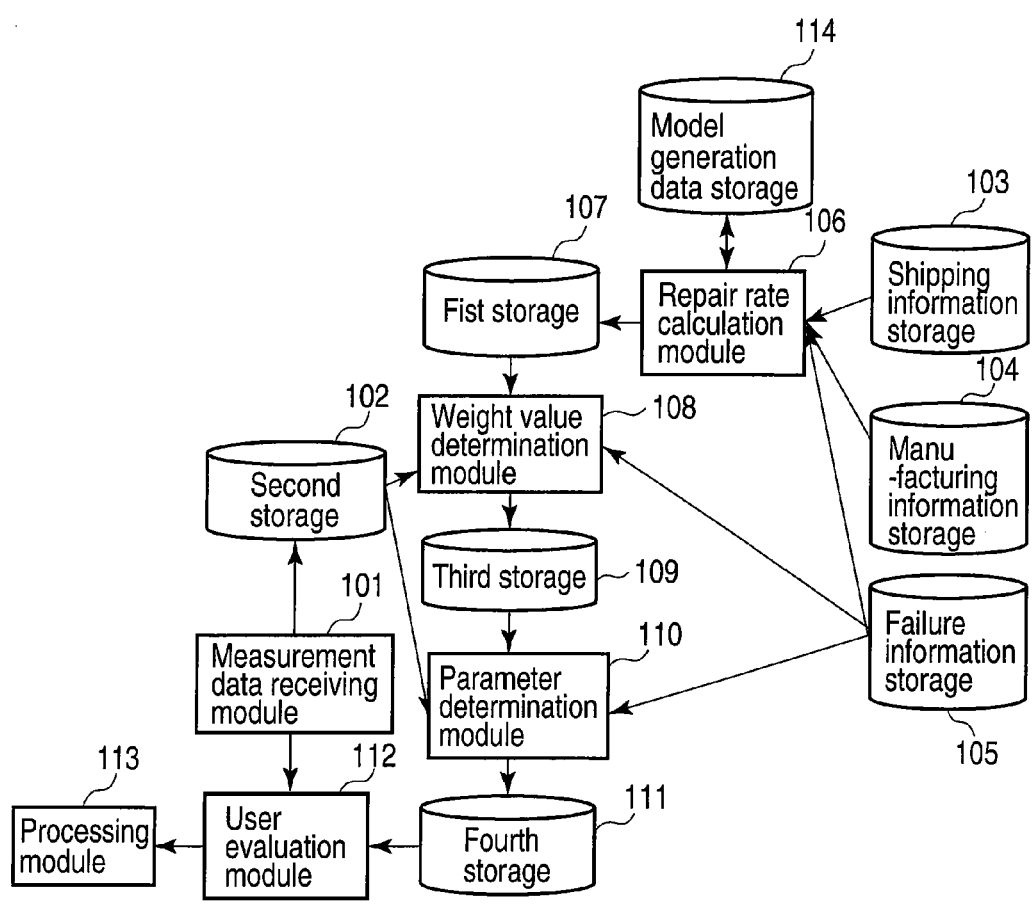
F I G. 1

| Manufacturing number | 23057V123J | 23057V128J | ····· | 53057K982J |
|---|---|---|---|---|
| Machine use start date | 20080911 | 20071209 | ····· | 20080901 |
| Machine activation duration | 2321122 | 921783 | ····· | 8821126 |
| Machine continuous activation duration (average) | 52567 | 25127 | ····· | 122569 |
| Machine continuous activation duration (standard deviation) | 25970 | 15977 | ····· | 125278 |
| Maximum shock value | 5 | 12 | ····· | 2 |
| Shock count | 23 | 117 | ····· | 11 |
| Vibration total | 1222 | 990159 | ····· | 226 |
| Maximum temperature value | 78.1 | 49.5 | ····· | 67.2 |
| High-temperature duration | 117.1 | 77.7 | ····· | 512.6 |
| CPU accumulated operating rate | 122321172 | 222929867 | ····· | 1787873 |
| Memory accumulated usage rate | 875959211 | 675949226 | ····· | 237552125 |

FIG. 4

| Manufacturing number | Factory shipping date | Sales base shipping date |
|---|---|---|
| 23057V123J | 20080511 | 20080520 |
| 23057V124J | 20080511 | 20080520 |
| 23057V125J | 20080511 | 20080520 |
| 23057V126J | 20080511 | 20080521 |
| 23057V127J | 20080511 | 20080521 |
| 23057V128J | 20080511 | 20080521 |
| ···· | ···· | ···· |

FIG. 5

| Manufacturing number | Model name | Manufacturing factory | Date of manufacture | CPU | PCB | HDD | HDD2 | Keyboard | ODD | Battery | ..... |
|---|---|---|---|---|---|---|---|---|---|---|---|
| 23057V123J | PIPLUP | CHINA1 | 20080510 | A1127633 | A2000311 | A3022289 | A3022289 | A4133657 | A5622131 | A6660044 | ..... |
| 23057V124J | PIPLUP | CHINA1 | 20080511 | A1127633 | A2000311 | A3022289 | — | A4133657 | A5622131 | A6660001 | ..... |
| 23057V125J | PIPLUP | CHINA2 | 20080511 | A1127633 | A2000311 | A3022285 | — | A4133657 | A5622131 | A6660001 | ..... |
| 23057V126J | PIPLUP | CHINA1 | 20080511 | A1127650 | A2000386 | A3022285 | — | A4133655 | A5622130 | A6660001 | ..... |
| 23057V127J | PIPLUP | CHINA2 | 20080511 | A1127650 | A2000386 | A3022280 | — | A4133657 | A5622130 | A6660001 | ..... |
| 23057V128J | PIPLUP | CHINA1 | 20080511 | A1127650 | A2000386 | A3022280 | — | A4133657 | A5622130 | A6660001 | ..... |
| ..... | ..... | ..... | ..... | ..... | ..... | ..... | ..... | ..... | ..... | ..... | ..... |

F I G. 6

| Manufacturing number | Failure date | Repair application date | Repair completion date | Exchanged component 1 | Exchanged component 2 | Exchanged component 3 | Exchanged component 4 | Exchanged component 5 |
|---|---|---|---|---|---|---|---|---|
| 23057V125J | 20081001 | 20081010 | 20081012 | PCB | — | — | — | — |
| 23057V127J | 20080930 | 20081001 | 20081002 | PCB | HDD | — | — | — |
| 23057V138J | 20081203 | 20081220 | 20081220 | Keyboard | — | — | — | — |
| 23057V180J | 20090101 | 20090104 | 20090111 | PCB | — | — | — | — |
| 23057V211J | 20081002 | 20081012 | 20081012 | ODD | PCB | — | — | — |
| 23057V213J | 20080925 | 20080925 | 20080928 | Keyboard | — | — | — | — |
| ..... | ..... | ..... | ..... | ..... | ..... | ..... | ..... | ..... |

F I G. 7

| Manufacturing number | Number of operating days within warranty period | Failure count | Model name | Manufacturing factory | Date of manufacture | CPU | PCB | HDD | HDD2 | Keyboard | ODD | Battery | ... |
|---|---|---|---|---|---|---|---|---|---|---|---|---|---|
| 23057V123J | 65 | 0 | PIPLUP | CHINA1 | 20080510 | A1127633 | A2000311 | A3022289 | A3022289 | A4133657 | A5622131 | A6660044 | ... |
| 23057V124J | 65 | 0 | PIPLUP | CHINA1 | 20080511 | A1127633 | A2000311 | A3022289 | — | A4133657 | A5622131 | A6660001 | ... |
| 23057V125J | 65 | 1 | PIPLUP | CHINA2 | 20080511 | A1127633 | A2000311 | A3022285 | — | A4133657 | A5622131 | A6660001 | ... |
| 23057V126J | 66 | 0 | PIPLUP | CHINA1 | 20080511 | A1127633 | A2000386 | A3022285 | — | A4133655 | A5622131 | A6660001 | ... |
| 23057V127J | 66 | 1 | PIPLUP | CHINA2 | 20080511 | A1127650 | A2000386 | A3022280 | — | A4133657 | A5622130 | A6660001 | ... |
| 23057V128J | 66 | 0 | PIPLUP | CHINA1 | 20080511 | A1127650 | A2000386 | A3022280 | — | A4133657 | A5622130 | A6660001 | ... |
| ... | ... | ... | ... | ... | ... | ... | ... | ... | ... | ... | ... | ... | ... |

F I G. 8

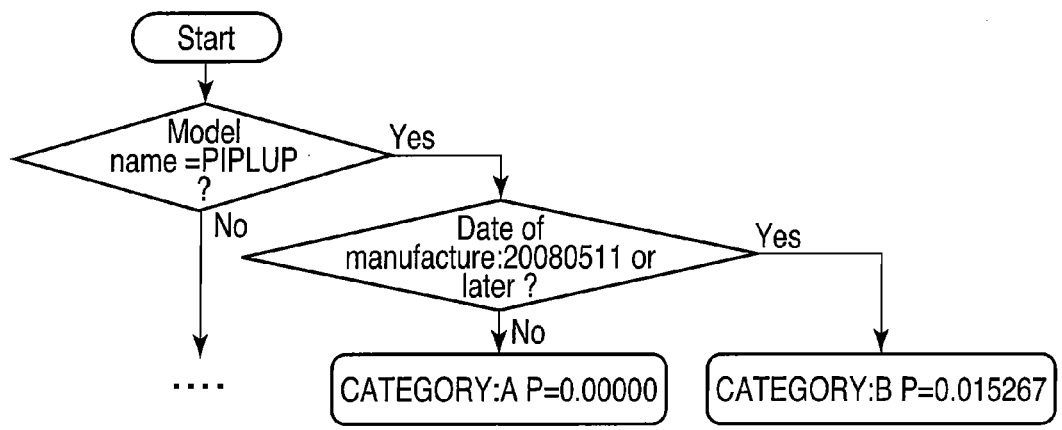
F I G. 9
| Manufacturing number | Repair rate (PPM) |
|---|---|
| 23057V123J | 2000 |
| 23057V124J | 2000 |
| 23057V125J | 2000 |
| 23057V126J | 2000 |
| 23057V127J | 1220 |
| 23057V128J | 1220 |
| .... | .... |
F I G. 10
| Manufacturing number | Weight value |
|---|---|
| 23057V123J | 0.0020 |
| 23057V124J | 0.0020 |
| 23057V125J | 0.9980 |
| 23057V126J | 0.0020 |
| 23057V127J | 0.9988 |
| 23057V128J | 0.0012 |
| .... | .... |
F I G. 11

| Parameter 1 | 0.4 |
| Parameter 2 | -0.5 |
| Parameter 3 | 3.3 |
| Parameter 4 | 0.35 |

| Manufacturing number | 23057V123J | | | | |
|---|---|---|---|---|---|
| Machine use start date | 20080911 | | | | |

| Date of measurement | 2008/9/1 | 2008/9/1 | 2008/9/2 | .... | 2009/1/20 |
|---|---|---|---|---|---|
| Machine continuous activation duration | 2 | 1 | 5 | .... | 2 |
| Maximum shock value | 0 | 5 | 0 | .... | 0 |
| Shock count | 0 | 1 | 0 | .... | 0 |
| Vibration total | 3 | 21 | 1 | .... | 3 |
| Maximum temperature value | 66.2 | 49.5 | 50 | .... | 67.2 |
| High-temperature duration | 1 | 0 | 0 | .... | 0 |
| CPU accumulated operating rate | 172 | 67 | 867 | .... | 873 |
| Memory accumulated usage rate | 9211 | 226 | 226 | .... | 2125 |

| Manufacturing number | 23057V123J | 23057V128J | .... | 53057K982J |
|---|---|---|---|---|
| Machine use start date | 20080911 | 20071209 | .... | 20080901 |
| Machine activation duration | 2321122 | 921783 | .... | 8821126 |
| Machine continuous activation duration (average) | 52567 | 25127 | .... | 122569 |
| Machine continuous activation duration (standard deviation) | 25970 | 15977 | .... | 125278 |
| Maximum shock value | 5 | 12 | .... | 2 |
| Shock count | 23 | 117 | .... | 11 |
| Vibration total | 1222 | 990159 | .... | 226 |
| Maximum temperature value | 78.1 | 49.5 | .... | 67.2 |
| High-temperature duration | 117.1 | 77.7 | .... | 512.6 |
| CPU accumulated operating rate | 122321172 | 222929867 | .... | 1787873 |
| Memory accumulated usage rate | 875959211 | 675949226 | .... | 237552125 |
| Presence/absence of inconsistency | 0 | 1 | | 0 |

FIG. 16

| Category number | Model | Manufacturing period start date | Manufacturing end date | Factory |
|---|---|---|---|---|
| 1 | PIPLUP | 2008/9/14 | 2008/10/15 | CHINA |
| 1 | EMPOLEON | 2008/9/25 | 2008/10/15 | CHINA |
| 2 | PIPLUP | 2008/10/16 | — | CHINA |
| 3 | PIPLUP | 2008/11/1 | — | OSAKA |
| .... | .... | .... | .... | .... |

FIG. 19

| Manufacturing number | Number of operating days within warranty period | Failure count | Category |
|---|---|---|---|
| 23057V123J | 65 | 0 | 1 |
| 23057V124J | 65 | 0 | 1 |
| 23057V125J | 65 | 1 | 1 |
| 23057V126J | 66 | 0 | 2 |
| 23057V127J | 66 | 1 | 2 |
| 23057V128J | 66 | 0 | 2 |
| .... | .... | .... | .... |

FIG. 20

| Category | Repair rate (PPM) |
|---|---|
| 1 | 18,000 |
| 2 | 3,000 |
| 3 | 2,000 |
| .... | .... |

FIG. 21

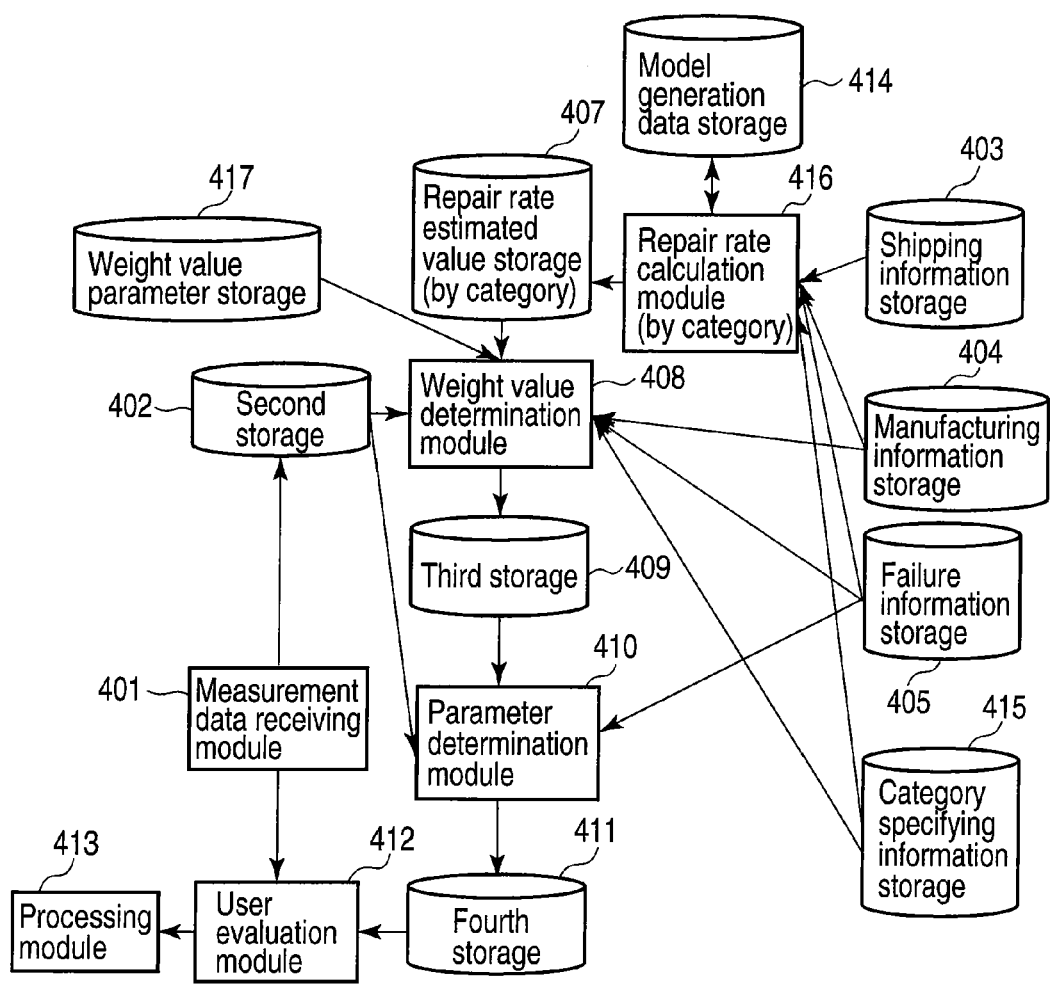
F I G. 2 2

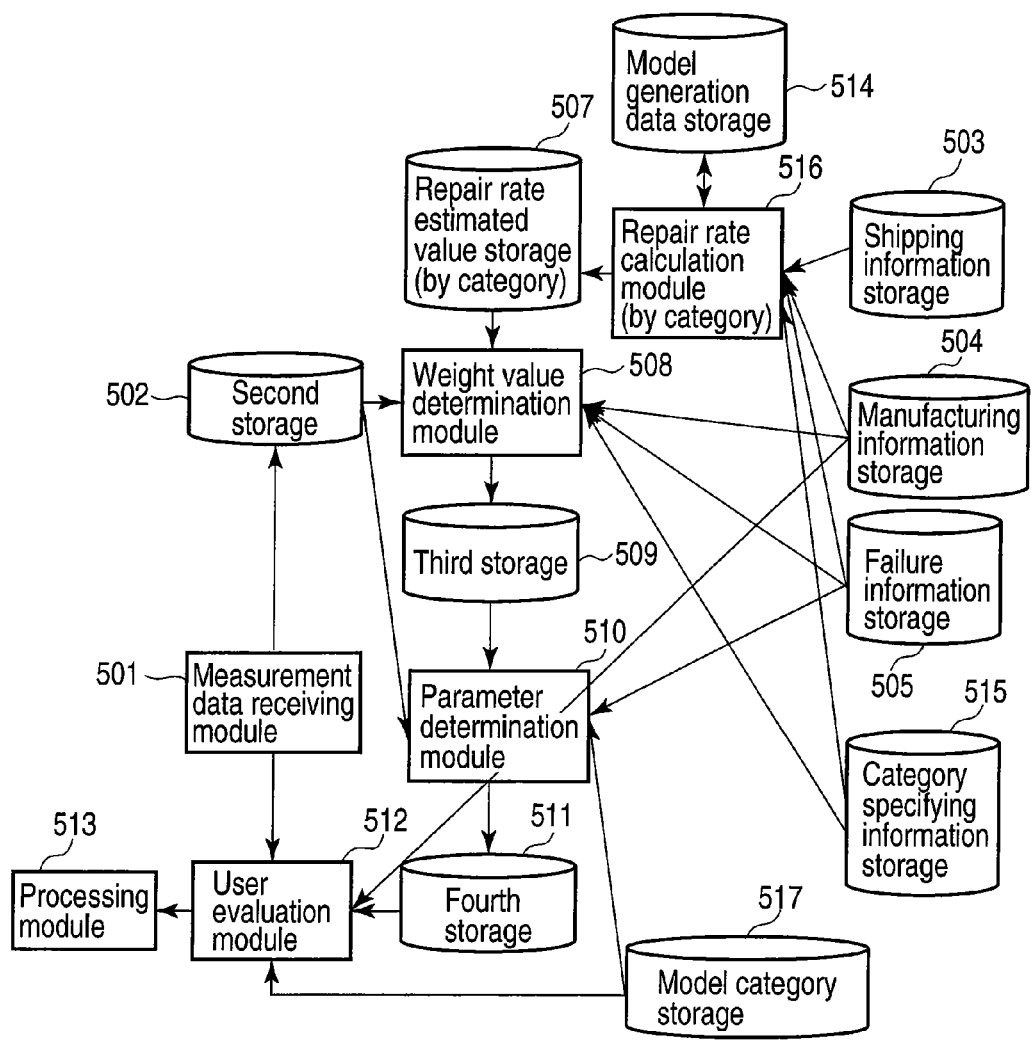
F I G. 23
| Corporate tough model | PP001 | PP002 | |
| --- | --- | --- | --- |
| Corporate general model | TUR22 | GRO22 | TRO22 |
| Consumer model | STA10 | STA20 | |
F I G. 24

|  | Category 1 | Category 2 | Category 3 |
|---|---|---|---|
| Parameter 1 | 0.4 | 0.4 | 0.4 |
| Parameter 2 | -0.5 | -0.5 | -0.5 |
| Parameter 3 | 3.3 | 3.3 | 3.3 |
| Parameter 4 | 0.35 | 0.35 | 0.35 |
F I G. 2 5
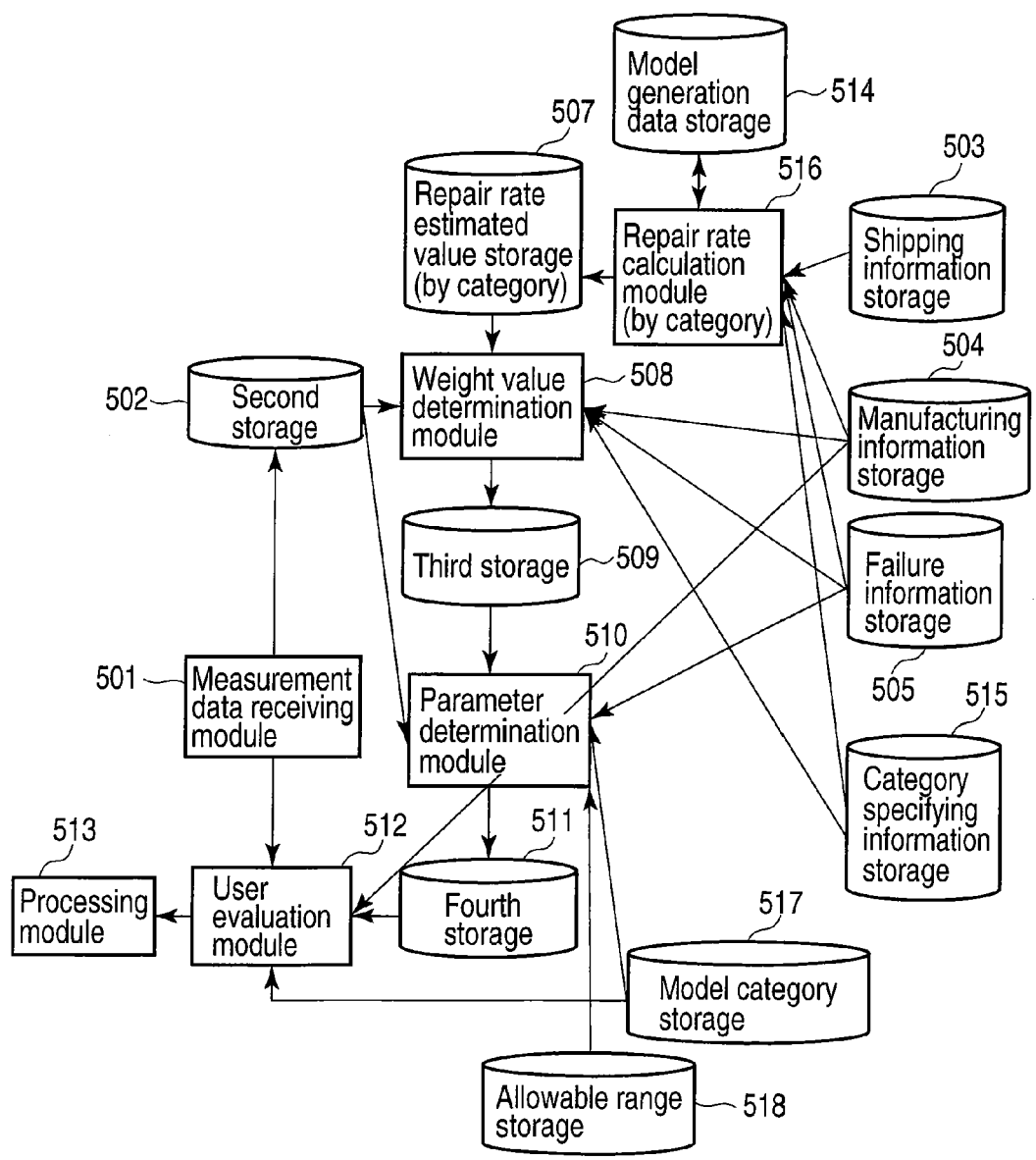
F I G. 2 6

|  | Index 1 lower limit value | Index 1 upper limit value | Index 2 lower limit value | Index 2 upper limit value | .... | Index 5 lower limit value | Index 5 upper limit value |
|---|---|---|---|---|---|---|---|
| Category 1 | – | 40000 | – | 240 | .... | – | 90 |
| Category 2 | – | 20000 | – | 100 | .... | – | 50 |
| Category 3 | – | 20000 | – | 100 | .... | – | 50 |

| Manufacturing number | Standard repair cost |
|---|---|
| 23057V123J | 21 |
| 23057V124J | 21 |
| 23057V125J | 21 |
| 23057V126J | 15 |
| 23057V127J | 15 |
| 23057V128J | 15 |
| .... | .... |

FIG. 31

| | Reference repair rate | Model | | |
|---|---|---|---|---|
| Corporate high-spec model | 2,000 | PP001 | PP002 | PP011 |
| Corporate general model | 3,000 | TUR22 | GRO22 | TOR22 |
| Consumer high-spec model | 3,000 | STA10 | | |
| Consumer general model | 5,000 | STA20 | | |

FIG. 32

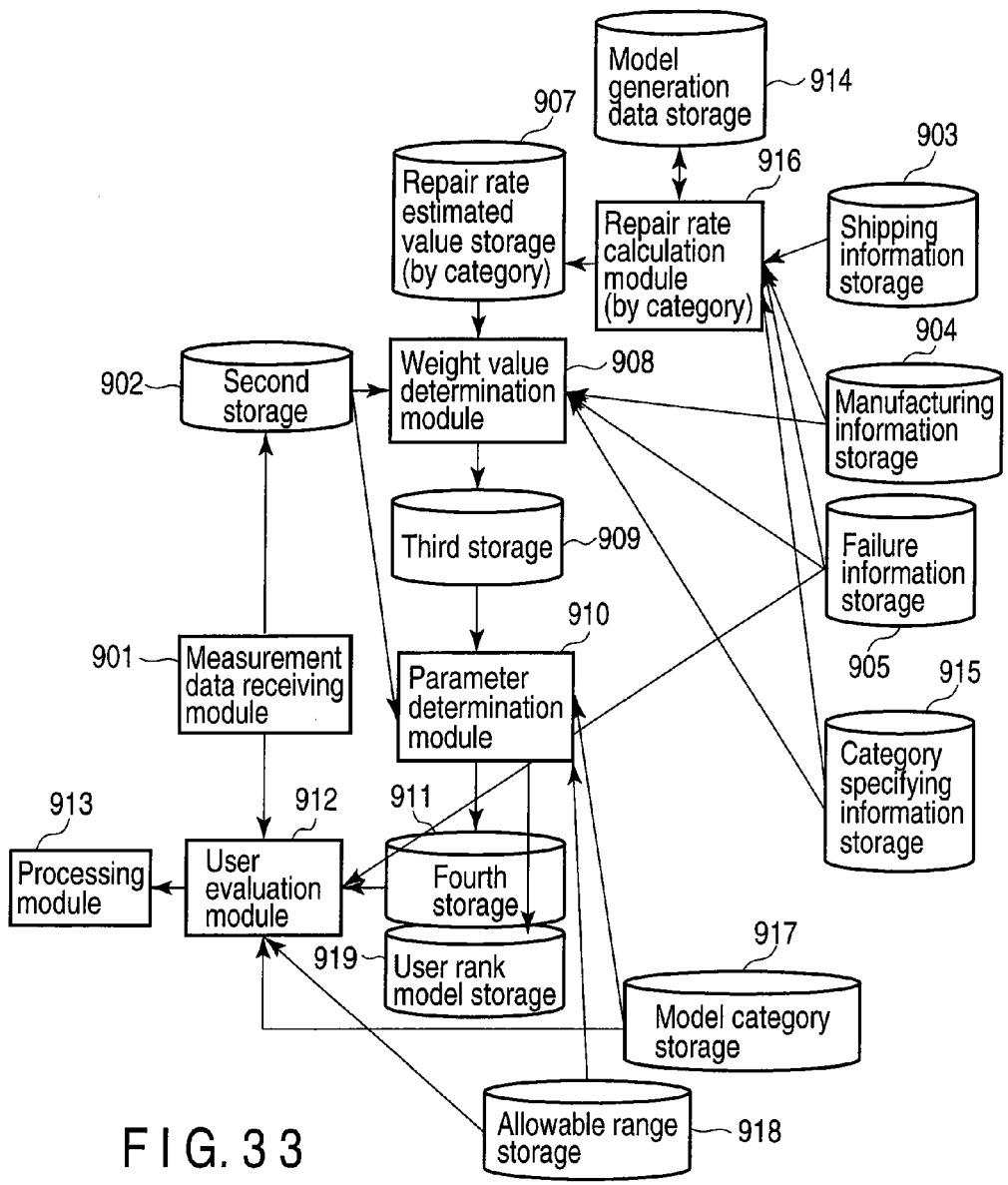
F I G. 33
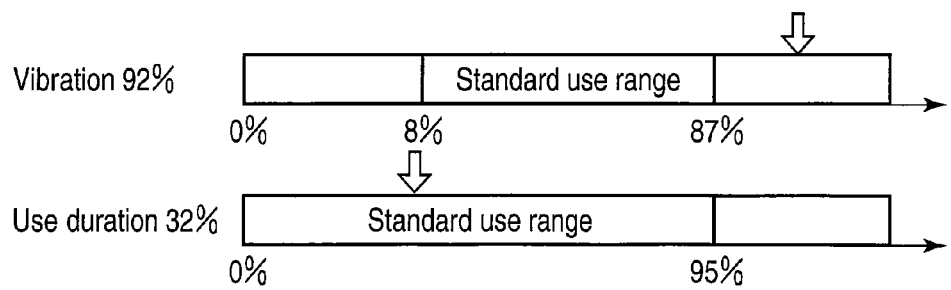
F I G. 34

USER EVALUATION APPARATUS DEPENDING ON HARDWARE USAGE STATUS

CROSS-REFERENCE TO RELATED APPLICATIONS

This application is based upon and claims the benefit of priority from prior Japanese Patent Application No. 2009-082989, filed Mar. 30, 2009, the entire contents of which are incorporated herein by reference.

BACKGROUND OF THE INVENTION

1. Field of the Invention

The present invention relates to an apparatus for performing user evaluation.

2. Description of the Related Art

Conventionally, a study of a technique for measuring vibrations and temperatures of hardware such as a personal computer (to be referred to as "PC" or "machine" hereinafter) and calculating a performance drop and degree of fatigue has been made. Also, an apparatus which acquires information from a sensor arranged inside a housing of a PC, and presents the risk of failures of the PC main body or its individual components to the user has been proposed (for example, see JP-A No. 2006-127070 (KOKAI)). A technique for evaluating repair rates of products based on their repair data for the hardware quality control department has also been developed.

However, with the related arts, upon evaluating the usage of each user, accurate evaluation cannot be made by checking only whether or not a PC went wrong in past times, and it is required to form a model that ventures into the usage of a user. On the other hand, PC failures normally have a high percentage of occurrence due to problems of the products themselves unlike automobile accidents. However, it is difficult so far to distinguish problems about the usages of users from those of products.

BRIEF SUMMARY OF THE INVENTION

According to one aspect, a user evaluation apparatus includes a parameter determination module which determines parameters of a user evaluation model required to calculate a degree of usage influence so as to maximize a target function. The target function may be defined using weight values, measurement data, and a failure information counting result. The apparatus also includes a user evaluation module which calculates and displays the degree of usage influence using the measurement data and the parameters of the user evaluation model.

BRIEF DESCRIPTION OF THE SEVERAL VIEWS OF THE DRAWING

FIG. 1 is a block diagram of a user evaluation apparatus according to the first embodiment;

FIG. 4 is a table showing a data example of measurement data according to the first embodiment;

FIG. 5 is a table showing a data example of shipping information according to the first embodiment;

FIG. 6 is a table showing a data example of manufacturing information according to the first embodiment;

FIG. 7 is a table showing a data example of failure information according to the first embodiment;

FIG. 8 is a table showing an example of model generation data according to the first embodiment;

FIG. 9 shows an example of a decision tree according to the first embodiment;

FIG. 10 is a table showing a data example of repair rate estimated value according to the first embodiment;

FIG. 11 is a table showing a data example of sample-dependent weight value according to the first embodiment;

FIG. 16 is a table showing a data example of measurement data according to the second embodiment;

FIG. 19 is a table showing a data example of category specifying information according to the third embodiment;

FIG. 20 is a table showing an example of model generation data according to the third embodiment;

FIG. 21 is a table showing a data example of category-dependent repair rate estimated value according to the third embodiment;

FIG. 22 is a block diagram of a user evaluation apparatus according to the fourth embodiment;

FIG. 23 is a block diagram of a user evaluation apparatus according to the fifth embodiment;

FIG. 24 is a table showing a data example of model category according to the fifth embodiment;

FIG. 25 is a table showing a data example of user evaluation model according to the fifth embodiment;

FIG. 26 is a block diagram of a user evaluation apparatus according to the sixth embodiment;

FIG. 31 is a table showing a data example of a standard repair cost according to the eighth embodiment;

FIG. 32 is a table showing a data example of a warranty category according to the eighth embodiment;

FIG. 33 is a block diagram of a user evaluation apparatus according to the ninth embodiment; and FIG. 34 shows a screen image transmitted from a processing module according to the ninth embodiment.

DETAILED DESCRIPTION OF THE INVENTION

Figure 2:
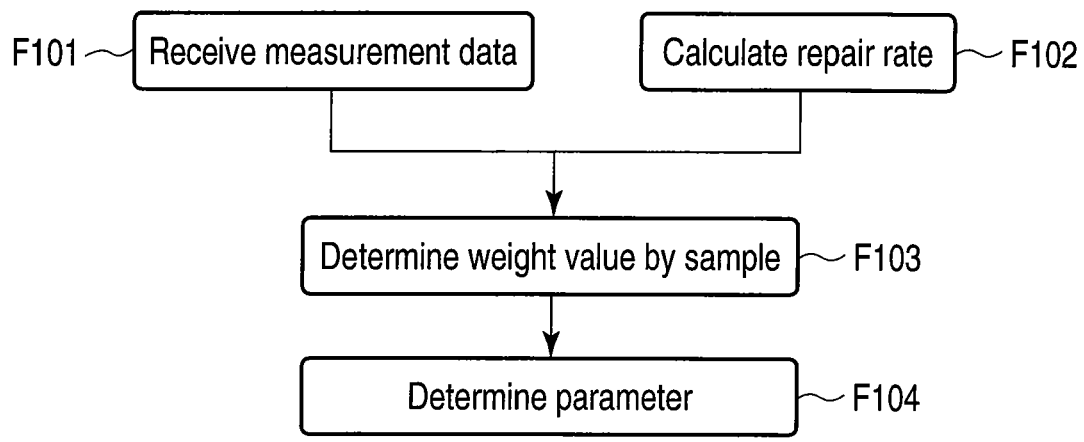
FIG. 2 is a flowchart showing the sequence of model generation processing according to the first embodiment.

According to embodiments described herein, information required to specify a product group corresponding to a constant quality and a failure rate $p_m$ within a constant quality range m are calculated based on failure information. An estimated value of a repair rate (to be described later) is that based on this failure rate. On the other hand, a PC includes a function of monitoring temperatures and vibrations and also a device for storing them, and transmits these pieces of information if the user permits. These pieces of monitoring information are transmitted to a server together with a manufacturing number, and the server records these pieces of information. As for the recorded information, based on information indicating whether or not a product of interest crashed within a predetermined period, if the product of interest crashed, a weight value 1-$p_m$ is set; if the product of interest did not crash, a weight value $p_m$ is set, thus eliminating the influence of the failure rate due to the product. Note that the presence/absence of failures may be replaced by that of repair histories. Then, by learning samples with weight values, a user evaluation model which estimates a repair rate from the usage of the user is generated, and the usage of the user is evaluated using this user evaluation model.

Thus, according to the embodiments, the usage can be fed back to the user, and an appropriate extended warranty fee can be calculated. An appropriate warranty fee can be calculated depending on the user's risk, and an extended warranty service of a PC can be provided at a lower price to the user of a safer usage.

First Embodiment

FIG. 1 is a block diagram of a user evaluation apparatus according to the first embodiment. This apparatus includes a measurement data receiving module 101, second storage 102, failure information storage 105, repair rate calculation module 106, first storage 107, weight value determination module 108, third storage 109, parameter determination module 110, fourth storage 111, and processing module 113.

The failure information storage 105 stores failure information counting results for a plurality of machines having the same characteristics as those of a plurality of machines to be measured. The repair rate calculation module 106 calculates repair rate estimated values for respective machines based on the failure information counting results stored in the failure information storage 105. The first storage 107 stores repair rate estimated values calculated by the repair rate calculation module 106. The measurement data receiving module 101 receives measurement data associated with usage statuses of the plurality of machines to be measured. The second storage 102 stores measurement data received by the measurement data receiving module 101. The weight value determination module 108 defines the plurality of machines to be measured as a plurality of samples, and determines weight values used to cancel differences among machines of the repair rate estimated values stored in the failure information storage 105 for the plurality of samples, respectively. The weight value storage 109 stores the respective weight values of the plurality of samples determined by the weight value determination module 108. The parameter determination module 110 defines a target function using the sample-dependent weight values determined by the weight value determination module 108, the measurement data received by the measurement data receiving module 101, and the failure information counting results stored in the failure information storage 105, and determines parameters of a user evaluation model required to calculate a degree of usage influence, so as to maximize the aforementioned target function. The fourth storage 111 stores the parameters of the user evaluation model determined by the parameter determination module 110. A user evaluation module 112 calculates the degree of usage influence using the measurement data received by the measurement data receiving module 101 and the parameters of the user evaluation model determined by the parameter determination module 110. The processing module 113 displays the degree of usage influence calculated by the user evaluation module 112.

The model generation processing sequence will be described below with reference to the flowchart shown in FIG. 2, and the user evaluation processing sequence will then be described with reference to the flowchart shown in FIG. 3.

[Model Generation]

In step F101 in FIG. 2, the measurement data receiving module 101 receives measurement data. Data are transmitted via the Internet, and the measurement data receiving module 101 receives the data. Furthermore, the received contents are stored in the second storage 102. FIG. 4 shows an example of data stored in the second storage 102. As shown in FIG. 4, the second storage 102 stores information such as "machine activation time", "machine activation duration", and "high-temperature duration" for each manufacturing number. These pieces of information are caused by the usages of machines, and may influence machine repair rates. In this specification, such information will be referred to as an "index".

This embodiment assumes a laptop computer as target hardware. A shock count, CPU accumulated operating duration, memory accumulated usage rate, and the like are used as indices, and their measurement data are collected. When target hardware is a product other than a computer, different indices are used. For example, in case of a television, a channel switching count may be used as one index. In case of a refrigerator, consumption power, inner temperatures of the refrigerator, and the like may be used as important indices.

In step F102, the repair rate calculation module 106 calculates repair rates based on information in a shipping information storage 103, a manufacturing information storage 104, and the failure information storage 105. The shipping information storage 103 stores data shown in FIG. 5, and the manufacturing information storage 104 stores data shown in FIG. 6. These storages store data of all manufactured products. On the other hand, the failure information storage 105 stores data shown in FIG. 7, and stores information associated with failures in association with all repaired machines.

According to shipping information stored in the shipping information storage 103, the total number of operating days to date of shipped machines can be estimated by, for example, (the total number of operating days=current date−sales base shipping date−30). In this example, assuming that use of a machine is started about 30 days after sales base shipping, "30" is subtracted. Note that the current date may be set according to an actual calendar or a date before the current date may be set in consideration of a time lag until data are collected. Especially, when the total number of operating days assumes a negative value, it has to be replaced by zero.

In this embodiment, in consideration of the fact that one requests a 100% repair for a manufacturer within a warranty period (e.g., one year), when the total number of operating days is larger than the warranty period, the number of operating days within the warranty period is calculated by replacing the total number of operating days by the warranty period.

The number of operating days within the warranty period is given by:

Number of operating days within warranty period=min[max[total number of operating days, 0], warranty period]

The failure information storage 105 stores information of machines repaired to date.

As a result, model generation data shown in FIG. 8 are stored in a model generation data storage 114. The model generation data include a manufacturing number, the number of machine operating days within a warranty period, a failure count within the warranty period, model name, date of manufacture, and component configuration information.

Next, by classifying machines based on pieces of information in the fourth column (i.e., "model name") and subsequent columns in FIG. 8, a plurality of categories with different failure rates are formed. For example, in FIG. 8, machines corresponding to a manufacturing factory "CHINA2", i.e., those having manufacturing numbers "23057V125J" and "23057V127J" are separated from the remaining machines. These two products form a first category, and the remaining products form a second category. In this case, these two machines have failed twice during a total of 131 (=65+66) operating days, but other machines have never failed during a total of 262 (=65+65+66+66) operating days. Hence, the two categories having different failure rates are formed. By classifying pieces of information in the fourth column and subsequent columns of the model generation data shown in FIG. 8 using a method called "decision tree", categories can be defined.

The decision tree may be generated in terms of high failure rates of products manufactured during a specific period (initial failures, mixing of failure components, an improvement of manufacturing process), different qualities depending on manufacturing factories, problems in specific components, and so forth. Classification using category specifying information that can specify product groups each corresponding to a given quality will be described in other embodiments.

From the generated decision tree, decision rules based on the items in the fourth column and subsequent columns of the model generation data shown in FIG. 8 are generated. FIG. 9 shows an example of the decision rules.

Once the decision tree is generated, a repair rate estimated value can be calculated for each machine.

For example, when a machine of interest has a model name "PIPLUP" and a date of manufacture "Jun. 20, 2008", this machine belongs to CATEGORY B, as can be seen from the decision rules shown in FIG. 9, and a repair rate estimated value p=0.015267 based on the failure rate of that category is obtained. Note that the estimated value represents a probability having, e.g., PPM (parts per million) as a unit.

As described above, the repair rate calculation module 106 uses data other than the manufacturing numbers and the failure counts within the warranty period as input to determine parameters to be given to a model which outputs a probability value, and defines the probability value output from the model characterized by the parameters as a repair rate estimated value. The repair rate estimated value calculated in this way is stored in the first storage 107. An example of data in the first storage 107 is as shown in FIG. 10, and the manufacturing numbers and repair rate estimated values are stored as pairs.

In step F103, sample-dependent weight values are determined. Samples accumulated in the second storage 102 are stored in the format shown in FIG. 4. Note that "sample" is (a sample of) a machine from which the measurement data are obtained. Based on a given manufacturing number in the measurement data shown in FIG. 4, a corresponding repair rate estimated value p stored in the first storage 107 is obtained. It is confirmed based on the data stored in the failure information storage 105 if a machine of that manufacturing number was repaired within, e.g., one year since a machine use start date stored in the second storage 102, thereby determining a presence/absence c of a repair history. For example, when a repair history is present, the value c is set to be "1"; when a repair history is absent, the value c is set to be "0".

Furthermore, a weight value w is determined by:

$$w = c(1-p) + (1-c)p \quad (1)$$

This weight value includes a not-to-repair probability (1−p) when a repair history is actually present, and a to-repair probability (p) when a repair history is absent. This value is stored in the third storage 109 in correspondence with the manufacturing number. FIG. 11 shows a practical example of sample-dependent weight values.

Next, in a parameter decision process in step F104, using the data stored in the third storage 109, second storage 102, and failure information storage 105, a target function given by, for example, equation (2) below is set.

$$l = \sum_{i \in U} w_i [c_i \log(q(u_i)) + (1-c_i)\log(1-q(u_i))] \quad (2)$$

where $q(\vec{u}_i)$ is called a degree of usage influence, and is given by:

$$q(\vec{u}_i) = \frac{1}{1 + \exp(\sum_j \alpha_j u_{ji} + \beta)} \quad (3)$$

Note that the above suffix i corresponds to the manufacturing number, and is used to identify a machine. Also, U is a set of machines which are used in current model generation and are stored in the second storage 102. Note that this U need not always be whole data, but it may represent a partial set like data for recent one year.

An index, i.e., the j-th component of $\vec{u}_i$ is $u_{ji}$. The index $u_{ji}$ is the j-th explanatory variable based on the data in the second storage 102. In this embodiment, for example, assume that $(u_{1i}, u_{2i}, u_{3i}, u_{4i}, u_{5i})$=(machine activation duration, machine continuous activation duration (average), shock count, vibration total, CPU accumulated operating rate/machine activation duration).

In order to explain the significance that the weight value is multiplied in equation (2), a set V of machines having a repair rate p is assumed, and will be examined below.

$$n_1 = \sum_{i \in V} c_i$$

$$n_0 = \sum_{i \in V} (1 - c_i)$$

where $n_1$ and $n_0$ are respectively the number of machines with repair histories, and that without any repair history included in V.

Note that the sum for i∈V of products of the machines with the repair histories which belong to the set V by the weight values, i.e., products of values $c_i$ (=1) indicating the presence of the repair history by weight values $w_i$ is given by:

$$n'_1 = \sum_{i \in V} w_i c_i = \sum_{i \in V} (1-p) c_i = (1-p) n_1$$

Also, the sum for i∈V of products of the machines without any repair history which belong to the set V by the weight values, i.e., products of values $c_i$ (=0) indicating the absence of the repair history by weight values $w_i$ is given by:

$$n'_0 = \sum_{i \in V} w_i(1-c_i) = \sum_{i \in V} p(1-c_i) = pn_0$$

When the model generated by the repair rate calculation module 106 is correct, we can consider:

$$p \approx \frac{n_1}{n_0 + n_1}$$

Using these equation, we have:

$$n'_1 \approx \frac{n_0 n_1}{n_0 + n_1}$$
$$n'_0 \approx \frac{n_0 n_1}{n_0 + n_1}$$

As a result, a repair rate p' upon counting the number of machines by multiplying the weight values is given by:

$$p' = \frac{n'_1}{n'_0 + n'_1} = \frac{1}{2}$$

This repair rate is independent of the original repair rate p. That is, the same repair rate that takes the weight values into consideration is calculated both for the set V of machines corresponding to a large output value p of the model generated by the repair rate calculation module 106 and for a set V' of machines corresponding to a small repair rate p. This means that differences of the repair rates p are canceled by multiplying the weight values. By multiplying the weight values in equation (2), repair rate differences estimated from pieces of conventional quality information (data stored in the modules 103 to 105) are excluded, and a model which evaluates repair rate differences caused by differences depending on usage statuses of users can be built.

In the parameter decision process in step F104, parameters $\tilde{\alpha}_j$ (j=1, 2, ..., J), $\tilde{\beta}$ are determined to maximize the target function determined based on equations (2) and (3).

Figures 12, 13:
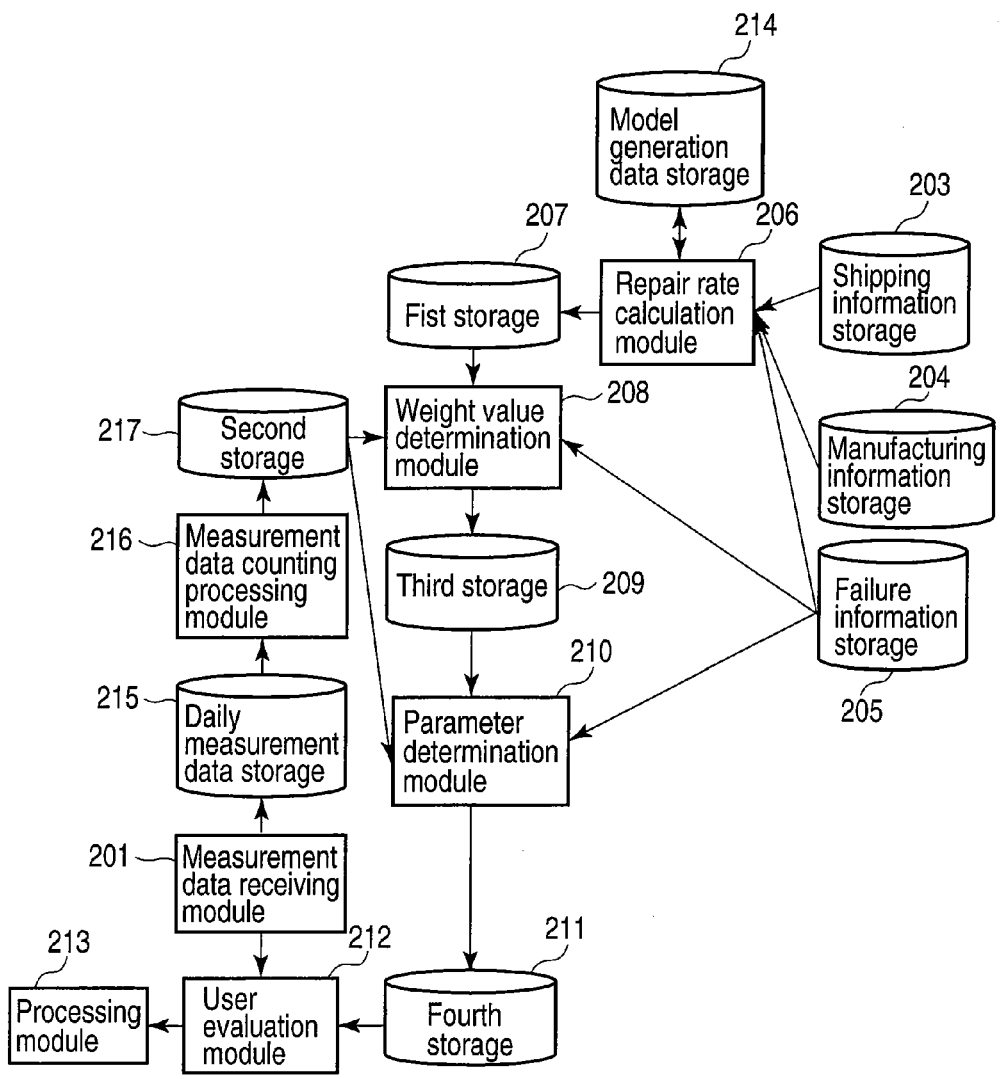
FIG. 12 is a table showing a data example of user evaluation model according to the first embodiment.
FIG. 13 is a block diagram of a user evaluation apparatus according to the second embodiment.

The determined parameters are stored in the fourth storage 111. FIG. 12 shows an example of data stored in the fourth storage 111.

[User Evaluation]

The user evaluation processing sequence will be described below with reference to the flowchart shown in FIG. 3. In step F111, the user evaluation module 112 receives the measurement data (items in FIG. 4) from the measurement data receiving module 101, and processes them to calculate the indices as in the parameter decision process in step F104. As described above, the indices ($u_{1i}$, $u_{2i}$, $u_{3i}$, $u_{4i}$, $u_{5i}$)=(machine activation duration, machine continuous activation duration (average), shock count, vibration total, CPU accumulated operating rate/machine activation duration).

The user evaluation module 112 reads out the parameters $\tilde{\alpha}_i$ (j=1, 2, ..., J),$\tilde{\beta}$ stored in the fourth storage 111, and calculates the degree $q(\vec{u}_i)$ of usage influence using equation (3). In step F112, the processing module 113 displays the degree of usage degree calculated by the user evaluation module 112 on a screen of, e.g., a display.

Second Embodiment

Figures 14, 15:
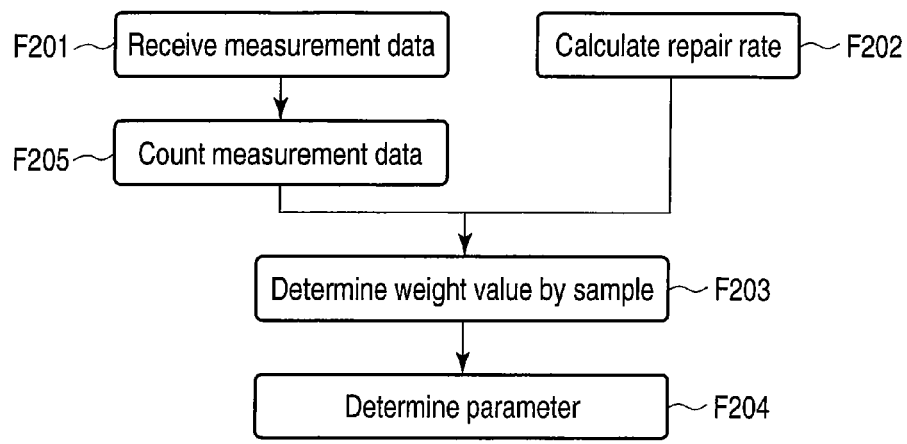
FIG. 14 is a flowchart showing the sequence of model generation processing according to the second embodiment.
FIG. 15 is a table showing a data example of daily measurement data.

FIG. 13 is a block diagram of a user evaluation apparatus according to the second embodiment, and FIG. 14 is a flow-chart showing the sequence of model generation processing according to the second embodiment.

As shown in FIG. 13, according to the second embodiment, the user evaluation apparatus includes a daily measurement data storage 215, measurement data counting processing module 216, and measurement data storage 217 in place of the second storage 102 in the arrangement according to the first embodiment shown in FIG. 1. The second embodiment with the above arrangement changes the model generation processing sequence, as shown in FIG. 14. User evaluation processing is the same as that in the first embodiment, as shown in FIG. 3. The following description will be given focusing on step F205 (measurement data counting) in the flowchart (model generation) shown in FIG. 14.

In step F201, measurement data from a user are received daily, and measurement dates and measurement data are recorded in the daily measurement data storage 215 in the format shown in FIG. 15. The measurement data are received everyday, but measurement data often fail to be received for certain reasons (for example, the user does not connect a machine to a network, or the power switch of the machine is OFF at a transmission/reception setting time). In this case, data which failed to be received are received collectively at a later date. When data are recorded every power ON/OFF operation of a machine, data having the same date are often accumulated for a plurality of columns like "September 1" in FIG. 15.

In the measurement data counting process in step F205, when one year has elapsed since a machine use start date stored in the daily measurement storage 215, the data for one year are counted. For example, an average and variance of machine continuous activation durations in the daily measurement storage 215 are calculated, and are stored in the second storage 217. Also, parallel to the counting process, it is confirmed if the data include inconsistent data. For example, it is checked if a maximum shock value is not zero although the shock count is zero, if the CPU accumulated operating rate is excessively larger than the machine continuous activation duration, and so forth. The presence/absence of inconsistency is recorded in the second storage 217 together with the counting result. FIG. 16 shows an example of data in the second storage 217.

As a result, a sample-dependent weight value decision process in step F203 and a parameter decision process in step F204 do not use inconsistent data. As for a user evaluation process, a user who provided inconsistent data is not evaluated.

Third Embodiment

Figure 17:
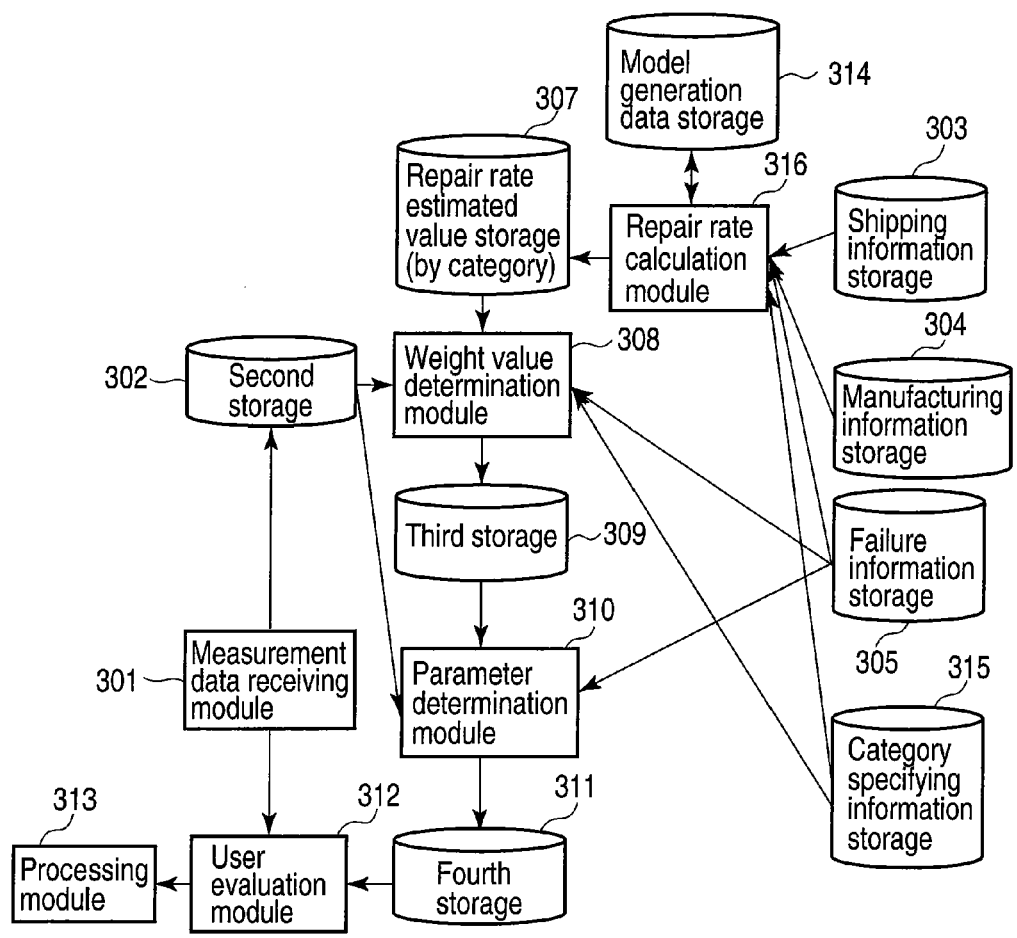
FIG. 17 is a block diagram of a user evaluation apparatus according to the third embodiment.
Figure 18:
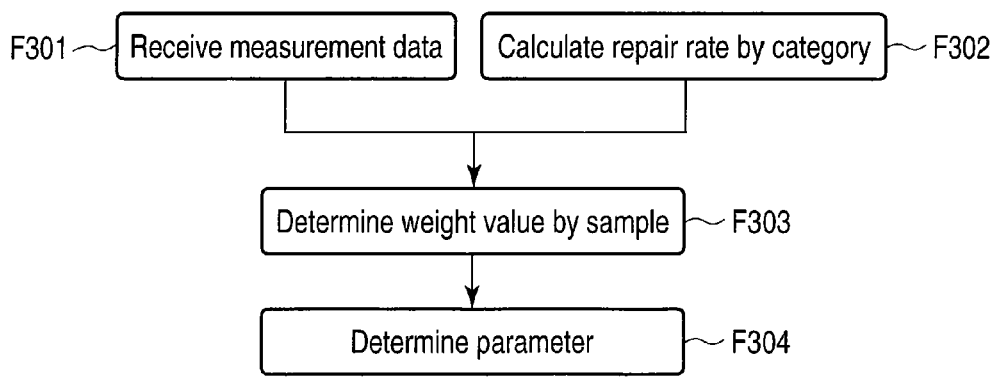
FIG. 18 is a flowchart showing the sequence of model generation processing according to the third embodiment.

FIG. 17 is a block diagram of a user evaluation apparatus according to the third embodiment, and FIG. 18 is a flowchart showing the sequence of model generation processing according to the third embodiment.

Compared to the arrangement of the first embodiment shown in FIG. 1, a category specifying information storage 315 is added in the third embodiment, as shown in FIG. 17. FIG. 19 shows data in the category specifying information storage 315. In FIG. 19, a corresponding category can be specified if a model, date of manufacture, and factory are determined. Machines in the same category are considered to have the same quality and the same repair rate. For example, the manufacture of a model "PIPLUP" has started since Sep. 14, 2008. After a manufacture change instruction was issued on October 15, the quality of the model "PIPLUP" was improved. For this reason, since the same quality is assured from September 14 until October 15, machines manufactured during this period belong to the same category. Although models "PIPLUP" and "EMPOLEON" are nearly the same products, since they have different names in terms of marketing, these models "PIPLUP" and "EMPOLEON" manufactured during the same period belong to the same category 1. In this manner, the category specifying information may include a category number, model name, and manufacturing period.

A category-dependent repair rate calculation process in step F302 is executed by a category-dependent repair rate calculation module 316. From data stored in a shipping information storage 303, manufacturing information storage 304, and failure information storage 305, data shown in FIG. 8 can be generated according to the same processing sequence as in the first embodiment. Based on the category specifying information stored in the category specifying information storage 315, categories corresponding to respective manufacturing numbers are determined to generate and store model generation data shown in FIG. 20 in a model generation data storage 314. Furthermore, using these data, a ratio between the number of operating days within the warranty period and a failure count is calculated to calculate a category-dependent repair rate. The calculated category-dependent repair rate is stored in a category-dependent repair rate estimated value storage 307. FIG. 21 shows an example of data in the category-dependent repair rate estimated value storage 307. The user evaluation processing sequence is the same as that in the first embodiment.

Fourth Embodiment

The fourth embodiment will explain another implementation method of a weight value determination module (108, 208, 308) in the first to third embodiments.

FIG. 22 is a block diagram of a user evaluation apparatus according to the fourth embodiment. This apparatus is characterized by further including a weight value parameter storage 417 which stores a weight value parameter s, in addition to the arrangement shown in FIG. 1. Letting p be a repair rate estimated value, a weight value determination module 408 determines, according to the presence/absence of repair histories represented by the failure information counting result, a weight value $(1-p)^s/p^{1-s}$ if a repair history is present or a weight value $p^s/(1-p)^{1-s}$ if a repair history is absent.

More specifically, the weight value determination module 408 calculates a weight value like:

$$w = c\frac{(1-p)^s}{p^{1-s}} + (1-c)\frac{p^s}{(1-p)^{1-s}} \quad (4)$$

where s is an arbitrary real number.

In this way, as the weight value required to cancel differences of repair rates p, equation (4) above can be used in addition to equation (1) above.

When the same calculations as in the case of the first embodiment are made, if $$n'_1 = \sum_{i \in V} w_i c_i = \sum_{i \in V} \frac{(1-p_i)^s}{p_i^{1-s}} c_i = \frac{(1-p)^s}{p^{1-s}} n_1$$

$$n'_0 = \sum_{i \in V} w_i (1-c_i) = \sum_{i \in V} p \frac{p_i^s}{(1-p_i)^{1-s}} (1-c_i) = \frac{p^s}{(1-p)^{1-s}} n_0$$

and $$p \approx \frac{n_1}{n_0 + n_1}$$

are used, since we have:

$$n'_1 \approx (n_0 + n_1)\left(\frac{n_0}{n_0+n_1}\right)^s \left(\frac{n_1}{n_0+n_1}\right)^s$$

$$n'_1 \approx (n_0 + n_1)\left(\frac{n_0}{n_0+n_1}\right)^s \left(\frac{n_1}{n_0+n_1}\right)^s$$

differences of repair rates p can be canceled by multiplying the weight values.

Hence, in this embodiment, the weight value is calculated according to the weight value parameter s which is set in advance. Assuming that the weight value parameter s=0 is set in the weight value parameter storage 417, the weight value determination module 408 calculates the weight value according to:

$$w = c\frac{1}{p} + (1-c)\frac{1}{(1-p)} \quad (5)$$

Other processes are the same as those in the third embodiment described above.

Fifth Embodiment

FIG. 23 is a block diagram of a user evaluation apparatus according to the fifth embodiment. This apparatus further includes a model category storage 517 which stores model categories each of which gives correspondence with at least one model or more. A parameter determination module 510 determines parameters of user evaluation models required to calculate degrees of usage influence for respective model categories. A fourth storage 511 stores the parameters of the user evaluation models required to calculate the degrees of usage influence for respective model categories. A user evaluation module 512 calculates the degrees of usage influence using the parameters of the user evaluation models required to calculate the degrees of usage influence for respective model categories.

As described above, according to this embodiment, the parameter determination module 510 generates independent user evaluation models for respective categories which are stored in advance in the model category storage 517. There are some different significances to categorize the user evaluation models in this way.

(Significance 1) Since general users and corporate users are assumed to have considerably different usages, it is desirable to generate independent user evaluation models. For this reason, categories are specified in terms of machines for general users or those for corporate users, and are registered in the model category storage 517.

(Significance 2) Since machines with tough design as a sales point and other machines have different assumed usages, it is desirable to generate independent user evaluation models. For this reason, categories are specified in terms of machines with tough design or those with general design, and are registered in the model category storage 517.

An example of data in the model category storage is as shown in FIG. 24. The parameter determination module 510 generates user evaluation models for respective sets of samples which belong to respective categories. For example, let $U_1$ be a set of samples of two models "PP001" and "PP002" since they belong to a corporate tough model category. Likewise, let $U_2$ be a set of samples for corporate general models, and $U_3$ be a set of samples for consumer models. For each set, the following target function is set:

$$l_k = \sum_{i \in U_k} w_i[c_i \log(q(u_i)) + (1-c_i)\log(1-q(u_i))]$$

Note that there are three different categories k=1, 2, and 3. Parameters are calculated for each k to obtain:

Parameters $\tilde{\alpha}^{(1)}_j$ (j=1,2,...,J), $\tilde{\beta}^{(1)}$ when $k$=1

Parameters $\tilde{\alpha}^{(2)}_j$ (j=1,2,...,J), $\tilde{\beta}^{(2)}$ when $k$=2

Parameters $\tilde{\alpha}^{(3)}_j$ (j=1,2,...,J), $\tilde{\beta}^{(3)}$ when $k$=3

These parameters are stored in the fourth storage 511. FIG. 25 shows an example of data in the fourth storage 511 according to this embodiment.

Figure 3:
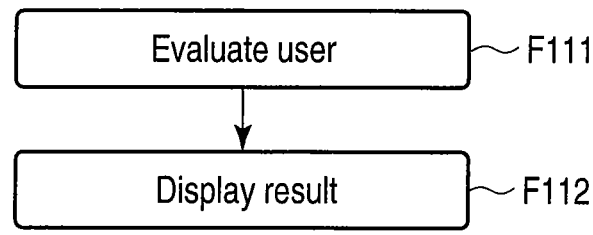
FIG. 3 is a flowchart showing the sequence of user evaluation processing according to the first embodiment.

The user evaluation sequence is nearly the same as that shown in FIG. 3. However, since practical user evaluation processing in step F111 is different from the first embodiment, this processing will be described below.

The user evaluation module 512 specifies a model based on a manufacturing number received from a measurement data receiving module 501 with reference to a manufacturing information storage 504, and specifies a category with reference to the model category storage 517. The user evaluation module 512 reads out the parameters of the corresponding category stored in the fourth storage 511 and calculates a degree $q(\vec{u}_i)$ of usage influence by equation (3) using the readout parameters.

Sixth Embodiment

FIG. 26 is a block diagram of a user evaluation apparatus according to the sixth embodiment. This embodiment is a modification of the fifth embodiment. A difference from the arrangement of the fifth embodiment lies in that an allowable range storage 518 is added. The allowable range storage 518 stores an allowable range defined by a set of an index name, upper limit value, and lower limit value. A parameter determination module 510 calculates an index whose value remains unchanged between the upper and lower limit values in correspondence with the index name based on measurement data and the allowable range. When a target function is defined using this index, a sample-dependent weight value, and failure information counting result, the parameter determination module 510 determines parameters of a user evaluation model required to calculate a degree of usage influence so as to maximize the target function. Note that this embodiment may also include a model category storage 517 which stores model categories each of which gives correspondence with at least one model or more. In this case, the allowable range storage 518 stores allowable ranges each defined by an index name, upper limit value, and lower limit value for respective model categories. The parameter determination module 510 calculates an index whose value remains unchanged between the upper and lower limit values in correspondence with the model category and index name based on the measurement data and allowable range. When a target function is defined using the calculated index, sample-dependent weight value, measurement data, and failure information counting result, the parameter determination module 510 calculates parameters of a user evaluation model required to calculate a degree of usage influence for each model category, so as to maximize the target function.

Figures 27, 28:
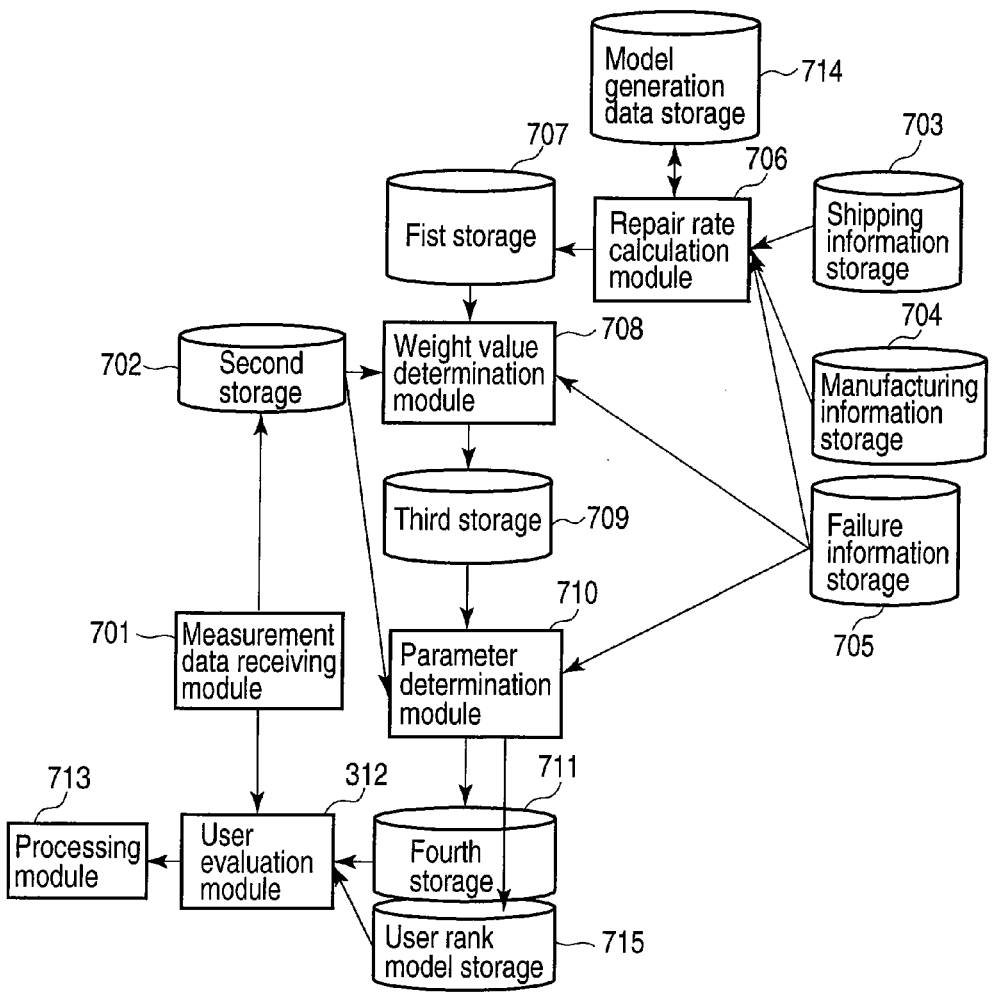
FIG. 27 is a table showing a data example of an allowable range according to the sixth embodiment.
FIG. 28 is a block diagram of a user evaluation apparatus according to the seventh embodiment.

The allowable range is defined by the upper and lower limit values for each index and category, and FIG. 27 shows an example of the allowable ranges.

Letting k be a category of a machine i, $u_{j,max}^{(k)}$ be an upper limit value of an index j, and $u_{j,min}^{(k)}$ be a lower limit value, an index $\vec{u}_i$ described in the first embodiment is converted as follows:

$$y_{ji} = u_{ji} - u_{j,max}^{(k)} \quad (u_{ji} > u_{j,max}^{(k)}) \qquad (6)$$
$$= 0$$
$$= u_{j,min}^{(k)} - u_{ji}$$

Furthermore, a new index Zji is obtained by:

$$z_{ji} = 0.5 - \frac{1}{1 + \exp(y_{ji})} \qquad (7)$$

The parameter determination module 510 sets a target function using Zji as follows:

$$l_k = \sum_{i \in U_k} w_i \left[ c_i \log(q(\vec{z}_i)) + (1-c_i)\log(1-q(\vec{z}_i)) \right]$$

where $q(\vec{z}_i)$ is called a degree of usage influence, which is given by:

$$q(\vec{z}_i) = \frac{1}{1 + \exp\left(\sum_j \alpha_j z_{ji} + \beta\right)}$$

In user evaluation processing, a user evaluation module 512 calculates the index $Z_{ji}$ according to equations (6) and (7).

Seventh Embodiment

FIG. 28 is a block diagram of a user evaluation apparatus according to the seventh embodiment.

A difference from the arrangement of the first embodiment shown in FIG. 1 lies in that a user rank model storage 715 which stores values corresponding to ranks for respective indices is added.

A parameter determination module 710 calculates a rank of an index value from a user rank model for each of a plurality of samples. When a target function is defined using the index value, a sample-dependent weight value, and failure information counting result, the parameter determination module 710 calculates parameters of a user evaluation model required to calculate a degree of usage influence so as to maximize the target function. A user evaluation module 712 calculates the degree of usage influence using measurement data, the rank of the index value, and the parameters of the user evaluation model. Note that the value corresponding to the rank for each index may be a percentile in a sample. Alternatively, the value corresponding to the rank for each index may be a deviation value in a sample.

More specifically, when the parameter determination module 710 defines indices, it sorts data in a second storage 702 in ascending order of index value j to calculate a rank $v_{ji}$ of a sample having a manufacturing number i. Furthermore, by setting $$v_{j,max} = \max_{i}(v_{ji}),$$

the parameter determination module 710 calculates:

$$s_{ji} = \frac{v_{ji}}{v_{j,max}} \times 100$$

Figures 29, 30:
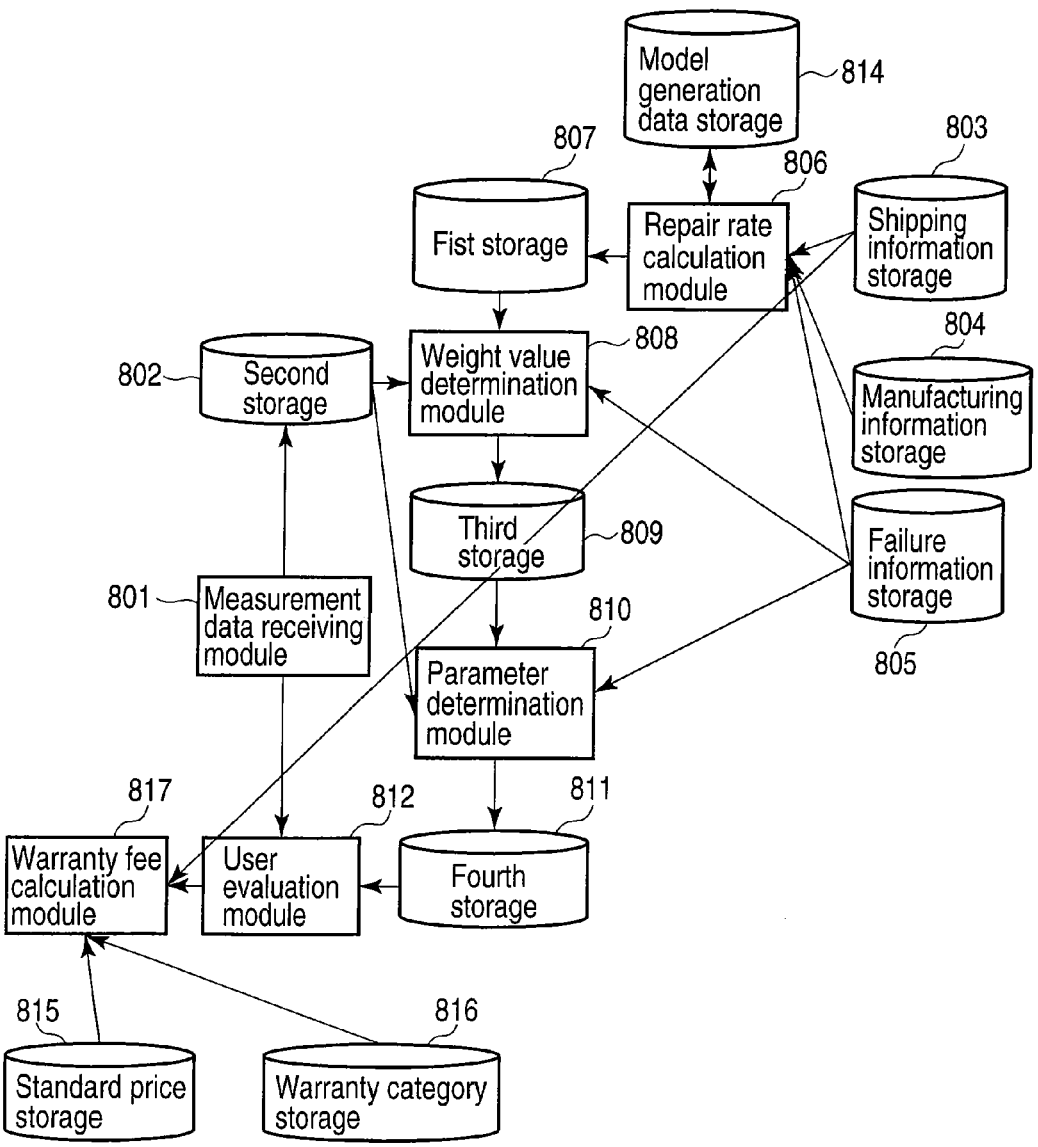
FIG. 29 is a table showing a data example of a user rank model according to the seventh embodiment.
FIG. 30 is a block diagram of a user evaluation apparatus according to the eighth embodiment.

This calculates a percentage position of a rank in ascending order in all the ranks. Values $u_{ji}$ having values $s_{ji}$=1%, 2%, 3%, ..., 99% are recorded in the user rank model storage 715. FIG. 29 shows an example of the recorded data.

The parameter determination module 710 sets the target function using $s_{ji}$ as follows:

$$l = \sum_{i \in U} w_i [c_i \log(q(\vec{s}_i)) + (1 - c_i) \log(1 - q(\vec{s}_i))]$$

where $q(\vec{s}_i)$ is called a degree of usage influence, which is given by:

$$q(\vec{s}_i) = \frac{1}{1 + \exp(\sum_j \alpha_j s_{ji} + \beta)}$$

Furthermore, the parameter determination module 710 determines parameters $\tilde{\alpha}_j$(j=1, 2, ..., J), $\tilde{\beta}$ to maximize this target function, and stores them in a fourth storage 711.

Eighth Embodiment

FIG. 30 is a block diagram of a user evaluation apparatus according to the eighth embodiment. Differences from the arrangement of the first embodiment shown in FIG. 1 lie in that a standard price storage 815, warranty category storage 816, and warranty fee calculation module 817 are added. FIG. 31 shows data stored in the standard price storage 815. As for data stored in the warranty category storage 816, categories and corresponding models are combined, and reference repair rates for respective categories are also given, as shown in FIG. 32. A reference repair rate is a numerical value which is externally determined in advance upon providing an insurance service.

The warranty fee calculation module 817 acquires a model name from a manufacturing number with reference to a shipping information storage 803. Also, the warranty fee calculation module 817 acquires a warranty category g corresponding to the model name and a reference repair rate $p_g$ in that category with reference to the warranty category storage 816. Furthermore, the warranty fee calculation module 817 acquires a degree $q(\vec{u}_i)$ of usage influence from a user evaluation module 812. The warranty fee calculation module 817 calculates a deemed repair rate $P_i$ using them by:

$$P_i = \frac{p_g q(u_i)}{p_g q(u_i) + (1 - p_g)(1 - q(u_i))}$$

Since this equation deems a repair rate part due to a quality difference unique to each product as the reference repair rate $p_g$, and calculates a repair rate in consideration of only the degree of usage influence, the calculation result is called a deemed repair rate.

The warranty fee calculation module 817 acquires a standard repair cost $C_i$ from the standard price storage 815. The warranty fee calculation module 817 calculates a proper warranty fee by $D_i = C_i(P_i + r)$ using the acquired cost (where r is a ratio required to tack on a profit, and is given in advance). The warranty fee calculation module 817 displays the calculated warranty fee $D_i$ on a screen.

As described above, this embodiment includes the standard price storage 815 which stores standard prices for respective machines, and the warranty fee calculation module 817 which calculates a warranty fee based on the degree of usage influence and standard price. The standard price may be a sales price of a machine. Alternatively, the standard price may be a standard repair cost of the machine.

Also, this embodiment may further include the warranty category storage 816 which stores reference repair rates given for respective warranty categories. In this case, the warranty fee calculation module 817 calculates a warranty fee based on the degree of usage influence, standard price, and reference repair rate.

Furthermore, letting A be a product of the reference repair rate and degree of usage influence and B be a product of (1—reference repair rate) and (1—degree of usage influence), the warranty fee calculation module 817 may calculate a deemed repair rate given by A/(A+B), and may calculate a warranty fee from the deemed repair rate and standard price.

Ninth Embodiment

FIG. 33 is a block diagram of a user evaluation apparatus according to the ninth embodiment. The arrangement shown in FIG. 33 corresponds to a combination of the sixth and seventh embodiments. As a result, a user evaluation module 912 can acquire information of an allowable range and rank for each index. By combining these pieces of information, a screen shown in FIG. 34 can be presented to the user. That is, an index name is specified on the left side, and $S_{ji}$ is displayed beside the index name. Also, a user rank model storage 919 acquires upper and lower limit values of the index corresponding to a machine of interest from an allowable range storage 918, converts them into percentiles, and can display the result.

In this way, this embodiment further includes the user rank model storage 919 which stores a value corresponding to a rank for each index, and the allowable range storage 918 which stores a set of an index name, upper limit value, and lower limit value for each category of a model. The user evaluation module 912 calculates a percentile of a machine for each index, and percentiles of the upper and lower limit values of the index. A processing module 913 can display a graph representing these values on a screen.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A user evaluation apparatus, comprising:
a failure information storage to store a failure information counting result for a plurality of repaired machines having the same characteristics as a plurality of machines to be measured;
a repair rate calculation module configured to calculate repair rate estimated values for the respective repaired machines based on the failure information counting result;
a first storage to store the repair rate estimated values;
a measurement data receiving module configured to receive measurement data associated with usage statuses of the plurality of machines to be measured;
a second storage to store the measurement data;
a weight value determination module configured to determine weight values used to cancel differences of the repair rate estimated values among machines respectively for the plurality of machines to be measured;
a weight storage to store the weight values respectively for the plurality of machines to be measured;
a parameter determination module configured to determine parameters of a user evaluation model required to calculate a degree of usage influence so as to maximize a target function, wherein the target function is defined using the weight values, the measurement data, and the failure information counting result;
a fourth storage to store the parameters of the user evaluation model;
a user evaluation module configured to calculate the degree of usage influence using the measurement data and the parameters of the user evaluation model; and
a processing module configured to display the degree of usage influence.

2. The apparatus according to claim 1, further comprising a weight value parameter storage to store a weight value parameter s, and
wherein letting p be the repair rate estimated value, the weight value determination module determines, according to a presence/absence of a repair history represented by the failure information counting result, $(1-p)^s/p^{1-s}$ as the weight value when a repair history is present and $p^s/(1-p)^{1-s}$ as the weight value when a repair history is absent.

3. The apparatus according to claim 1, wherein letting p be the repair rate estimated value, the weight value determination module determines, according to a presence/absence of a repair history represented by the failure information counting result, 1−p as the weight value when a repair history is present and p as the weight value when a repair history is absent.

4. The apparatus according to claim 1, further comprising a model generation data storage to store model generation data including a manufacturing number, the number of machine operating days within a warranty period, a failure count within the warranty period, a model name, a date of manufacture, and component configuration information, and
wherein the repair rate calculation module determines parameters to be given to a model which outputs a probability value using, as inputs, data other than the manufacturing number and the failure count within the warranty period, and defines a probability value output from the model characterized by the parameters as the repair rate estimated value.

5. The apparatus according to claim 1, further comprising:
a category specifying information storage to store category specifying information required to specify a set corresponding to a constant repair rate;
a category-dependent repair rate calculation module configured to calculate the repair rate estimated vales for respective categories specified by the category specifying information; and
a category-dependent repair rate estimated value storage to store the repair rate estimated values for respective categories.

6. The apparatus according to claim 1, further comprising:
a daily data storage to store daily measurement data based on measurement data received a plurality of times from the respective machines to be measured by the measurement data receiving module;
a measurement data counting processing module configured to count the daily measurement data, and to detect a presence/absence of inconsistency of data; and
a count data storage to store a counting result by the measurement data counting processing module and the presence/absence of inconsistency of data, and
wherein the weight value determination module calculates the weight values for machines free from inconsistency, and
the user evaluation module calculates the degrees of usage influence for the machines free from inconsistency.

7. The apparatus according to claim 1, further comprising a user rank model storage to store values corresponding to ranks for respective indices, and
wherein the parameter determination module calculates ranks of index values from a user rank model respectively for the plurality of machines to be measured, and determines the parameters of the user evaluation model required to calculate the degree of usage influence so as to maximize a target function which is defined using the index values, the weight values, and the failure information counting result, and
wherein the user evaluation module calculates the degree of usage influence using the measurement data, the ranks of the index values, and the parameters of the user evaluation model.

8. The apparatus according to claim 1, further comprising:
a standard price storage to store standard prices for the respective machines to be measured; and
a warranty fee calculation module configured to calculate a warranty fee from the degree of usage influence and the standard price.

9. The apparatus according to claim 1, further comprising:
a user rank model storage to store values corresponding to ranks for respective indices; and
an allowable range storage to store a set of an index name, an upper limit value, and a lower limit value for each category of a model, and
wherein the user evaluation module calculates a percentile of a machine for each index, and percentiles of the upper limit value and the lower limit value of the index, and
the processing module displays a graph which represents these values on a screen.

* * * * *